(12) United States Patent
Shvaiger et al.

(10) Patent No.: US 10,310,771 B1
(45) Date of Patent: Jun. 4, 2019

(54) REPLICATION TARGET SELECTION

(71) Applicant: EMC IP Holding Company LLC, Hopkinton, MA (US)

(72) Inventors: Felix Shvaiger, Brighton, MA (US); Arieh Don, Newton, MA (US); Anton Kucherov, Milford, MA (US)

(73) Assignee: EMC IP Holding Company LLC, Hopkinton ( * ) Notice: Subject to any disclaimer, the term of this patent is extended or adjusted under 35 U.S.C. 154(b) by 0 days.

(21) Appl. No.: 15/662,521

(22) Filed: Jul. 28, 2017

(51) Int. Cl.
*G06F 12/10* (2016.01)
*G06F 3/06* (2006.01)

(52) U.S. Cl.
CPC .......... *G06F 3/0665* (2013.01); *G06F 3/061* (2013.01); *G06F 3/067* (2013.01); *G06F 3/0647* (2013.01); *G06F 3/0685* (2013.01); *G06F 3/0605* (2013.01); *G06F 3/0637* (2013.01); *G06F 3/0649* (2013.01)

(58) Field of Classification Search
CPC .............................. G06F 3/0665; G06F 3/067
USPC ......................................................... 711/165
See application file for complete search history.

(56) References Cited

U.S. PATENT DOCUMENTS

2009/0150626 A1* 6/2009 Benhase ............. G06F 11/1456
711/162

\* cited by examiner

*Primary Examiner* — Jae U Yu
(74) *Attorney, Agent, or Firm* — Daly, Crowley Mofford & Durkee, LLP

(57) ABSTRACT

Described embodiments provide systems and methods for operating a storage system. A portion of data currently on a source Logical Unit (LUN) of a disk array of a plurality of disk arrays is written to a destination LUN of a disk array of a plurality of disk arrays. The destination LUN of a disk array of the plurality of disk arrays to write the data to is established based on an efficiency indicator associated with the destination LUN of a disk array of the plurality of disk arrays. The writing at least a portion of data currently on a source LUN of a disk array of a plurality of disk arrays may be performed as part of a replication process or as part of a relocation process.

15 Claims, 8 Drawing Sheets

REPLICATION TARGET SELECTION

BACKGROUND

A storage system may include data protection systems that back up production site (e/g., a source device) data by replicating production site data on a secondary backup storage system (e.g., a replication site or a destination device). In some environments deduplication maybe used in conjunction with replication to provide for efficient use of bandwidth and disk space. The backup storage system may be situated in a physically remote location from the production site. In such systems, it may be desirable to determine a replication target selection. A storage system may also include a host connected to multiple arrays. Data residing on one array may be moved to another array.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a method for determining a storage target selection. In one embodiment, the method includes determining to write at least a portion of data currently on a source Logical unit (LUN) in a disk array of a plurality of LUNs in a disk array to a destination LUN in a disk array of a plurality of remote disk arrays. The method may further include establishing, based on a n efficiency factor associated with the writing of the data, a destination LUN in a disk array of the plurality of remote disk arrays to write the data to. The efficiency factor may take into account a percentage of data that is currently present on the destination LUN in a disk array as well as other functions such as an amount of load on the destination LUN in a disk array and how full the LUN in a disk array is. The method may further include determining an amount of weight given to each factor of the efficiency indicator, as determined by a user. The method may additionally include writing the data on the source array of the plurality of disk arrays to the destination disk array of the plurality of remote disk arrays.

Other embodiments may include a computerized device, configured to process all the method operations disclosed herein as embodiments of the invention. In such embodiments, the computerized device includes a memory system, a processor, communications interface in an interconnection mechanism connecting these components. The memory system is encoded with a process that provides storage target selection as explained herein that when performed (e.g. when executing) on the processor, operates as explained herein within the computerized device to perform all of the method embodiments and operations explained herein as embodiments of the invention. Thus, any computerized device that performs or is programmed to perform the processing explained herein is an embodiment of the invention.

Other arrangements of embodiments of the invention that are disclosed herein may include software programs to perform the method embodiment steps and operations summarized above and disclosed in detail below. More particularly, a computer program product is one embodiment may have a computer-readable medium including computer program logic encoded thereon that when performed in a computerized device provides associated operations providing storage target selection as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

The term "storage device" may refer to a storage array including multiple storage devices. The terms storage, disk, storage array and disk array are used interchangeably herein. The term "replication" refers to data backup in which compatible storage copy data from one storage to another. Array-based replication software runs on one or more storage controllers resident in disk storage systems, synchronously or asynchronously replicating data between similar storage, such as arrays, at the logical unit (LUN) or volume block level. The term can refer to the creation of local copies of data within the same array as the source data, as well as the creation of remote copies in an array situated off site.

The term "relocation" refers to a technique wherein data is copied from a source disk device to a destination disk device, and wherein the source disk device may no longer be required. Replication provides a copy of the data from a source disk to a destination disk and maintains the copy on the original source disk, while relocation provides a copy of the data from a source disk to a destination disk and may not maintain the copy on the original source disk The term "deduplication" refers to a technique used to reduce the amount of storage space and communications bandwidth a system uses to store data. Storage systems often contains duplicate copies of many pieces of data. For example, the same file may be saved in several different places by different users, or two or more files that aren't identical may still include much of the same data. Deduplication eliminates these extra copies by saving just one copy of the data and replacing the other copies with pointers that lead back to the original copy. Deduplication is frequently used in backup and disaster recovery applications, but it can be used to free up space in primary storage as well.

Figure 1:
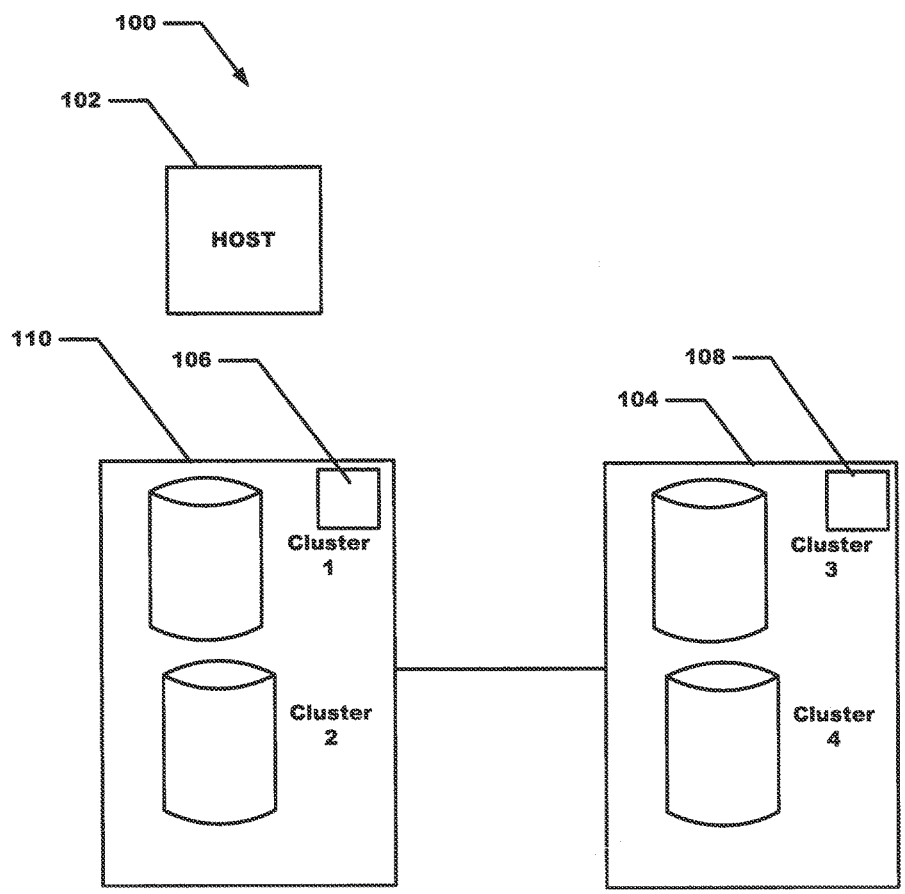
FIG. 1 is a high-level block diagram of a disk array target selection system, in accordance with illustrative embodiments.

Referring to the illustrative embodiment shown in FIG. 1, a system 100 may include a host 102, which may generally be a facility where one or more hosts and/or virtual machines run data processing applications that read data from and write data to storage systems 110 and 104. Production site 110 may back up (e.g., replicate) production data to a replication site 104. The replication site 104 may replicate production site data and enable rollback of data of production site 110 to an earlier point in time (PIT). Rollback may be used in the event of data corruption or a disaster, or alternatively in order to view or to access data from an earlier point in time. Also shown is a storage target selection module 106 on production site 110 and a storage target selection module 108 on replication site 104 for selecting target array, as described more fully below.

Production site storage and replication site replica storage may include storage devices for storing data, such as arrays of disks. Storage may provide (e.g., expose) one or more logical units (LUs) to which production commands are issued.

In some embodiments, production site 110 may send its write transactions to replication site 104 using a variety of modes of transmission, such as synchronous replication or asynchronous replication. For example, in synchronous replication, host 102 may send each write transaction to storage and also send each write transaction to cluster 1 and cluster 2 to be replicated on replica storage. In asynchronous replication, host 102 may receive several I/O requests and combine them into an aggregate "snapshot" or "batch" of write activity performed to storage in the multiple I/O requests, and may send the snapshot to replication site 104 for journaling and incorporation in in replica storage.

A similar technique may be used in the relocation process. Data is moved from one LUN of a disk array (a source) of a LUN of another disk array (a destination). The LUN of a disk array may be in the same array or in different arrays. There may be several reasons for relocation of data from one LUN of a disk array to another LUN of a disk array. The reasons include, but are not limited to, the source LUN of a disk array may be slower than the destination LUN of a disk array and there is a desire for faster disk processing, the source LUN of a disk array may be showing signs of a potential failure so the data should be moved before an actual failure occurs, or a desire for improved efficiency which requires a different LUN of a disk array than the one currently being used.

Figure 2:
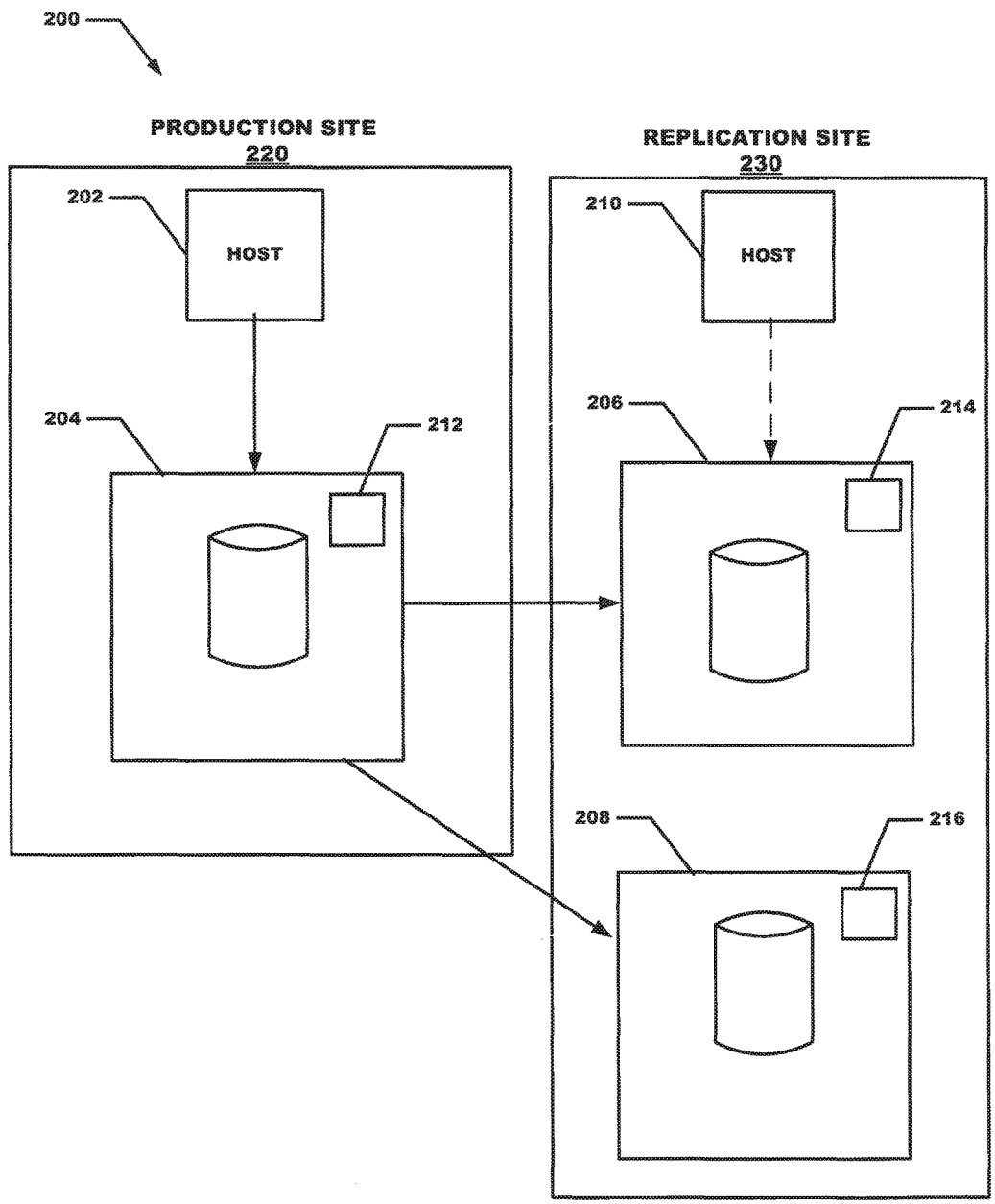
FIG. 2 is a block diagram illustrating an interaction between a production site, and a replication site for a replication operation, in accordance with illustrative embodiments.

FIG. 2 is a block diagram illustrating an interaction between a production site 220 and a replication site 230 for a replication operation. A storage environment 200 is shown, wherein a host 202 is writing data to device in array 204. Also, the data being written to device 204 is replicated to a remote device in a remote array 206. This can happen synchronously or asynchronously. Additionally, data being written to device 204 may also be replicated to device 208. A second host 210 may also be available in the event host 202 becomes unavailable. Also shown are storage target selection modules 212, 214 and 216 in the respective sites 220, 230.

In some embodiments, the replication site could be co-located with the production site, and would provide protection in the event of a production system malfunction. In another example, the production site and replication site could be in located in different geographic areas. This would provide protection not only in the case of a production site malfunction, but also in the case where co-located sites would be inoperable for example in case of a natural disaster (earthquake, hurricane, flood). In the embodiment where the production site and replication sites are located in different geographic locations, asynchronous replication would require less bandwidth and cost as compared to synchronous replication, and would therefore may be preferred for replication.

In some embodiments the system may have one replication copy be synchronous (for example New York to New Jersey), and another copy be asynchronous (for example New York to Ohio). In another embodiment there could be two synchronous copies (for example one in upstate New York and one in New Jersey). The number of replication sites, the locations of the replication sites and the type of replication being used may be user determined.

Figure 3:
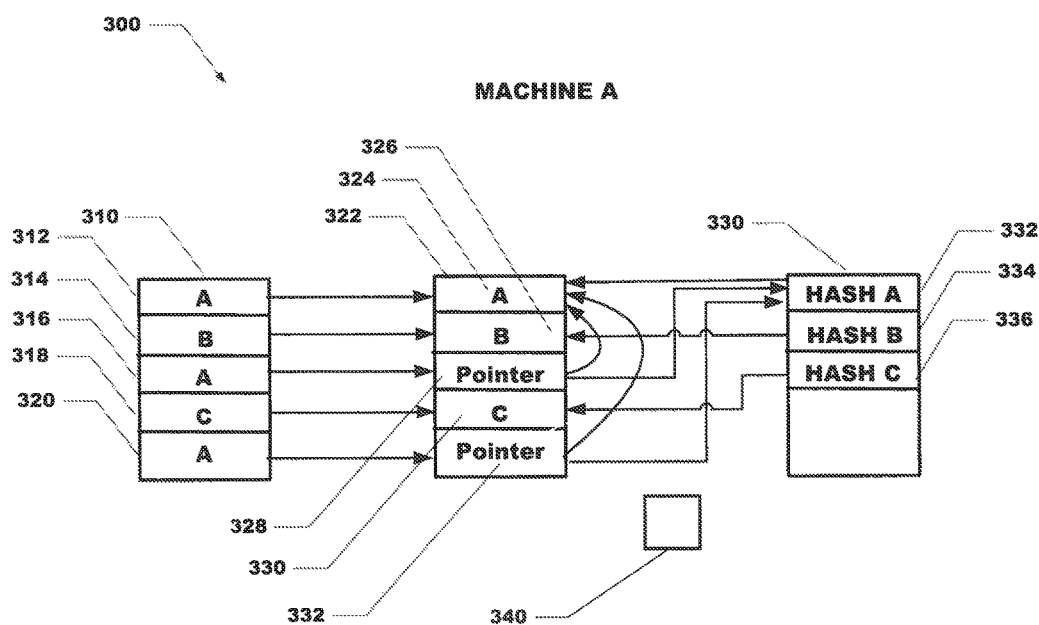
FIG. 3 is a diagram illustrating an example data layout for storage devices, in accordance with illustrative embodiments.

Referring now to FIG. 3, an environment 300 for performing deduplication is shown. A storage device 310, receives data and stores data. As shown in storage device 310, the storage device has received data A and stored it in location 312. Storage device 310 has received data B and stored it in location 314. Storage device 310 has received data A (same data as in location 310) and stored it in location 316. Storage device 310 has received data C and stored it in location 318. Storage device 310 has received data A (same data as in location 312 and 316) and stored it in location 320.

Storage device 322 is configured for performing deduplication. Initially the deduplication device 322 does not have any data stored thereon. As shown in storage device 322, the device has received data A and checks to see if the storage array that device 322 is on already has a copy of data A stored thereon. The storage array device 322 is on, at this time, does not have a copy of data A stored thereon, so the deduplication device 322 stores data A in location 324. Deduplication device 322 has received data B and again checks to see there is an existing copy of data B. The storage array deduplication device 322 is on doesn't have a pre-existing copy of data B, so deduplication device 322 stores data B in location 326. Deduplication device 322 has received data A from location 316 and checks to see if there is an existing copy of data A on the deduplication device. The storage array deduplication device 332 is on does have a copy of data A already stored thereon (location 324), so instead of duplicating the data by storing data A again at location 328, instead deduplication device stores a pointer to location 324 which contains data A. Deduplication device 322 has received data C and checks to see if there is an existing copy of data C on the array. The array deduplication device 322 is on doesn't have a copy of data C previously stored on the device, so data C is stored in location 330. Duplication device 322 has received data A from location 320 and checks to see if there is an existing copy of data A on the array. The array deduplication device 322 is on does have a copy of data A stored thereon, so instead of storing data A again at location 332, instead a pointer to location 324 which contains data A is stored in location 332.

In one example, a pointer may require only twenty bytes of data, whereas a data block may require eight kilobytes of storage. Since a pointer takes up much less space than a regular data block entry, significant storage space is saved by the deduplication methodology. As shown, deduplication results in storing the data once and storing a pointer for other occurrences of the same data.

Hash table 330 shows the hash value for each data entry. Hash A 332 is a hash of data A in location 324, hash B 334 is a hash of data B at location 326 and Hash C has a hash of data C in location 336. The pointers also point to the corresponding hash in the hash table. For example, the pointer at location 328 also points to HASH A in location 332 of hash table 330. Similarly, the pointer at location 332 also points to HASH A in location 332 of hash table 330. The Hash table entries also point to the corresponding data stored on the deduplication device 322. In this manner if data A is moved, the pointers in locations 328 and 332 still point to the hash of A. Also shown is disk array target selection module 340

Figure 4:
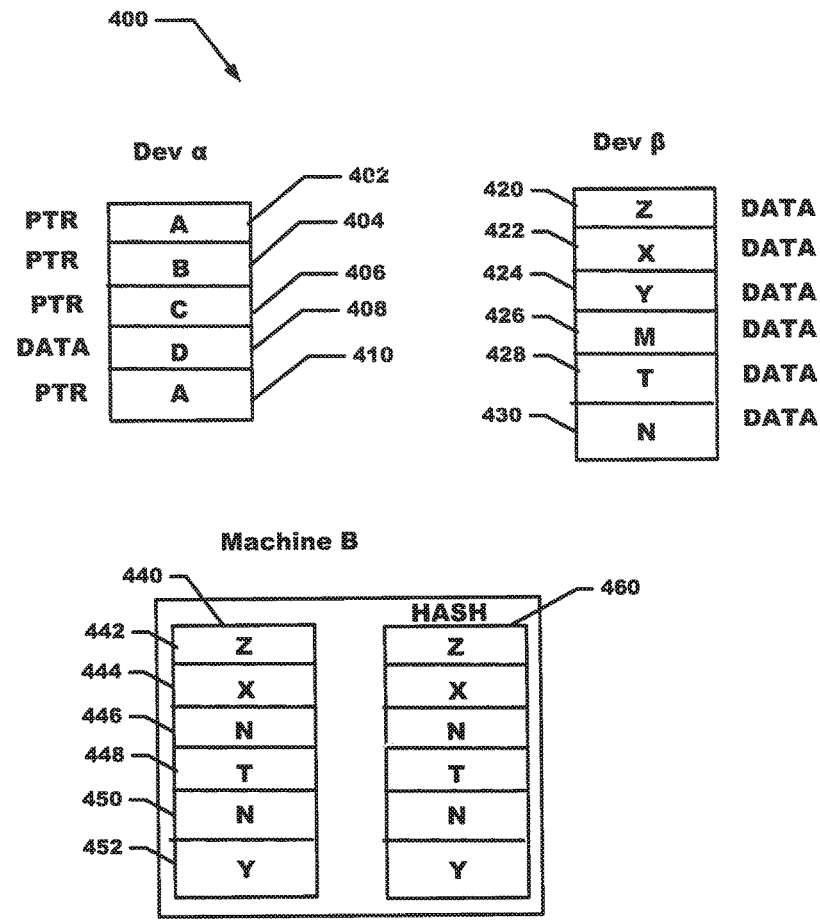
FIG. 4 is a block diagram illustrating an example data layout in a deduplication arrangement for storage devices in a production site and potential replication sites, in accordance with illustrative embodiments.

Referring now to FIG. 4 in conjunction with FIG. 3, new device α is shown having a pointer to data A in location 402, a pointer to data B in location 404, a pointer to data C in location 406, data D in location 408 and a pointer to data A in location 410. Also shown is new device β which is shown having data Z in location 420, data X in location 422, data Y in location 424, data M in location 426, data T in location 428, and data N in location 410.

Machine B is shown having device 440 and associated hash table 460. Device 440 includes data Z at location 442, data X at location 444, data N at location 446, data T at location 448, data N at location 450 and data Y at location 452. The hash table 460 includes entries for each of the data entries.

In one embodiment, the remote replication target in this environment involves replicating device α to Machine A (FIG. 3) while replication of the data on device β is served by Machine B. This is because the pointers and data for data A, B and C are already on Machine A, and the data for device β is already on Machine B.

Figure 5:
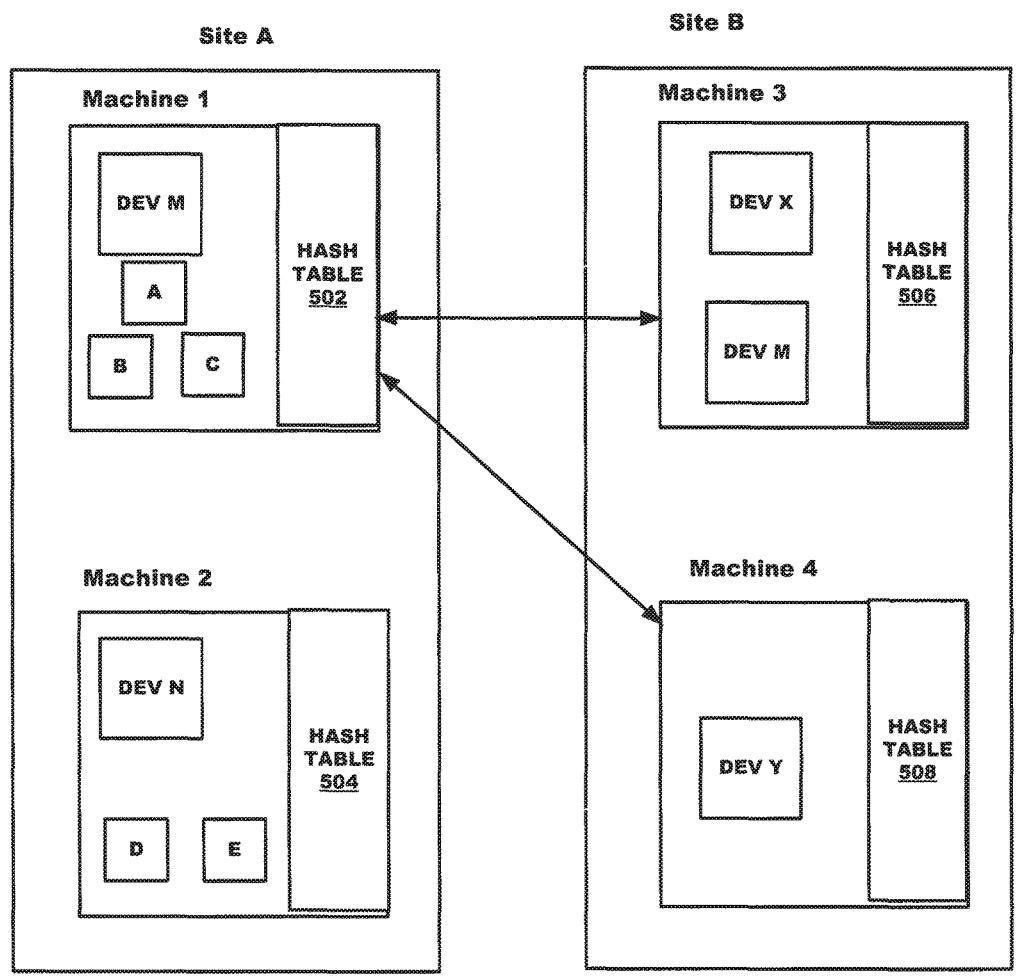
FIG. 5 is a block diagram illustrating an example storage devices and arrays, in accordance with illustrative embodiments.

Referring now to FIG. 5, site A includes Machine 1 and Machine 2, while site B includes Machine 3 and Machine 4. Machine 1 includes device M as well as devices A, B and C. Machine 1 also includes a hash table 502. The hash table is one table for devices M, A, B and C. In one embodiment, there is only one hash table per Machine, regardless of the number of devices on the Machine. Site A also includes Machine 2 which includes device N and devices D and E as shown. Machine 2 also includes a hash table 504.

Site B includes Machine 3 which includes device M, and Machine 4. Site B includes device M and device X and also a hash table 506 for both devices. Site B also includes Machine 4 which includes device Y. Machine 4 also includes a hash table 508.

There is a desire to replicate device M of Machine 1 from site A to site B. The replication can be performed either using Machine 3 of site B or Machine 4 of site B as targets. The conventional method would be to simply choose a machine that includes a device that has enough available space. While this technique of simply using a device with enough available space may work, it may not be the most efficient way to utilize available storage and communication bandwidth.

Site A has a communication link to both Machines of site B. Data can be sent from device M of Machine 1 to Machine 3 and from device M to Machine 4. Site A will send only the hashes of device M to Machine 3 and send only the hashes of device M to Machine 4. Sending only the hash values is more efficient them sending blocks of data. After site A sends only the hashes for dev M to Machine 3, site A receives an answer from Machine 3 as to what percent of device M data is already on the destination Machine. After site A sends only the hashes for dev M to Machine 4, site A receives an answer from Machine 4 as to what percent of device M data is already on the destination Machine.

Machine 3 receives all the device M hashes and goes through its hash table and determines what percentage of device M hashes are already resident on Machine 3. In this example, the answer is ninety-five percent. Accordingly, there is only a requirement to save five percent of new data if Device M is replicated to Machine 3.

The same procedure is repeated for Machine 4. Machine 4 receives all device M hashes and goes through its hash table and determines what percentage of device M hashes are already resident on Machine 4. In this example, the answer is seventy-five percent. Accordingly, there is a need to save twenty-five percent of new data if replication of device M is performed using Machine 4. Thus, the better choice is to replicate device M to Machine 3. Replication of device M to Machine 4 not only requires more data being sent from Machine 1 to Machine 4, but will also consume more available storage on Machine 4. The choice is to replicate to Machine 3, where there is only a need to send five percent of new data as well as consuming only five percent of the available space on the disk.

This entire process may be periodically performed to ensure best use of system resources, and the replication procedure may change from Machine 3 to Machine 4.

The replication determination procedure may further take into account an array load on a LUN of a disk array and how full a LUN is in addition to the percent of a device data already existing on the LUN of a disk array. Each of these factors can be given a weight in the determination of an optimal device to preform replication to.

In another embodiment, a relocation process is used to move data from a source LUN of a disk array to a destination disk. Referring back to FIG. 1, a host 102 may be connected to multiple arrays (cluster 1 and cluster 2). Data residing on one array may be moved to another array in order to improve storage costs without loss of connectivity or performance. In one embodiment, the storage savings benefits of having data reside on various inter-connected arrays is determined. Further, the data can be moved between the arrays without any impact to the way the host views the device. Once the data is moved between the arrays the devices names are swapped so there is no impact to how the host views the device (the device name on the host doesn't change). When two deduplicable arrays are interconnected (such as by replication links) each array may produce per-device statistics regarding the number of data blocks already present on another cluster that is connected to the same host by checking whether each chunk hash already resides on the other array.

The array may also produce statistics on the storage saving when moving the LUN of a disk array off the current array. A simple cost function may incorporate the percent of data already resident on another array to determine devices which are good candidates to be moved to another array. Also factored in is the savings gained on the current array (with some minimum gain required and hysteresis not to move devices back and forth). Other factors the cost function may include is array load, array percent full, and the like. A determination may be made by a user regarding how much weight should be given to each factor in determining the destination device (e.g. is storage savings more important than reducing array load etc.). Once the function decides on the best candidates to be moved a migration tool, for example PowerPath Migration Enabler (PPME), may be used (either manually or automatically) to migrate the volume from the current array to the destination device determined by way of the function.

Figure 6A:
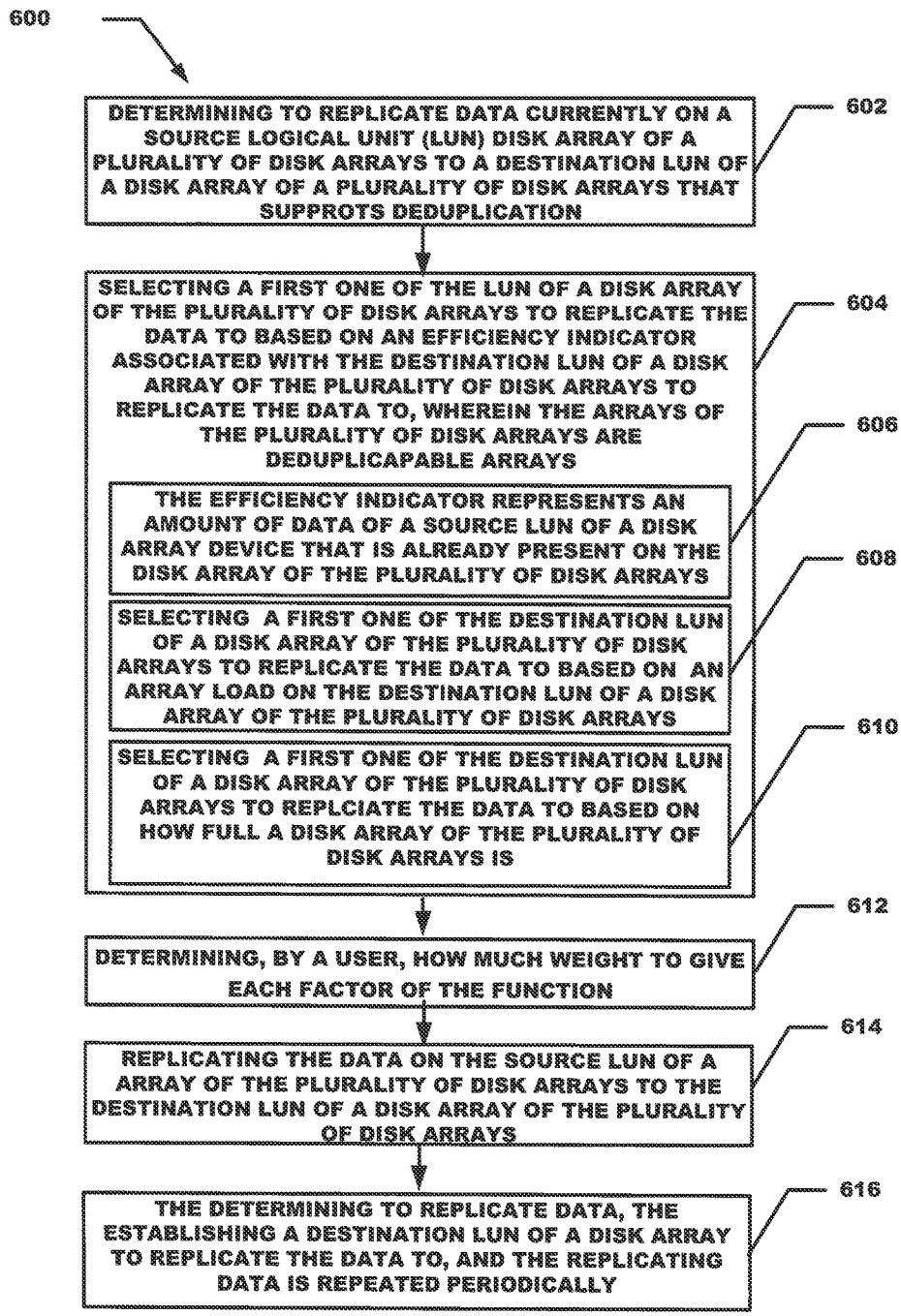
FIG. 6A is a flowchart of a first illustrative disk array target selection method in accordance with illustrative embodiments.

Referring now to FIG. 6A, a flow chart of one embodiment of a method for disk array target selection is shown. Method 600 begins with processing block 602 which shows determining to replicate data currently on a source logical unit (LUN) of a disk array of a plurality of disk arrays to a destination LUN of a disk array of a plurality of remote disk arrays that support deduplication.

Processing block 604 shows selecting a first one of the destination LUN of a disk array of the plurality of disk arrays to replicate the data to based on an efficiency indicator associated with the destination LUN of a disk array of the plurality of disk arrays, wherein the plurality of disk arrays are deduplicable arrays.

As shown in processing block 606 the efficiency indicator represents an amount of data of a source LUN of a disk array that is already present on a remote disk array of the plurality of remote disk arrays. As further shown in processing block 608 selecting a first one of the destination LUN of a disk array of the plurality of disk arrays to replicate the data to based on an array load on the destination LUN of a disk array of the plurality of disk arrays. As shown in processing block 610, selecting a first one of the destination LUN of a disk array of the plurality of disk arrays to replicate the data to based on how full a disk array of the plurality of disk arrays is.

Processing block 612 discloses determining, by a user, how much weight to give each factor of the function. For example, in certain conditions the amount of load on a LUN of a disk array may be more important to consider than how full a LUN of a disk array is.

Processing block 614 recites replicating the data on the source LUN of a disk array of the plurality of disk arrays to the destination device. Once the destination device has been determined, the data can be written to the destination LUN of a disk array of the plurality of disk arrays.

Processing block 616 shows wherein the determining to replicate data, the establishing a destination LUN of a disk array to replicate the data to, and the replicating may be repeated periodically. The disk array target selection is a dynamic process, and may be re-evaluated periodically to ensure the efficiency of the process being performed.

Figure 6B:
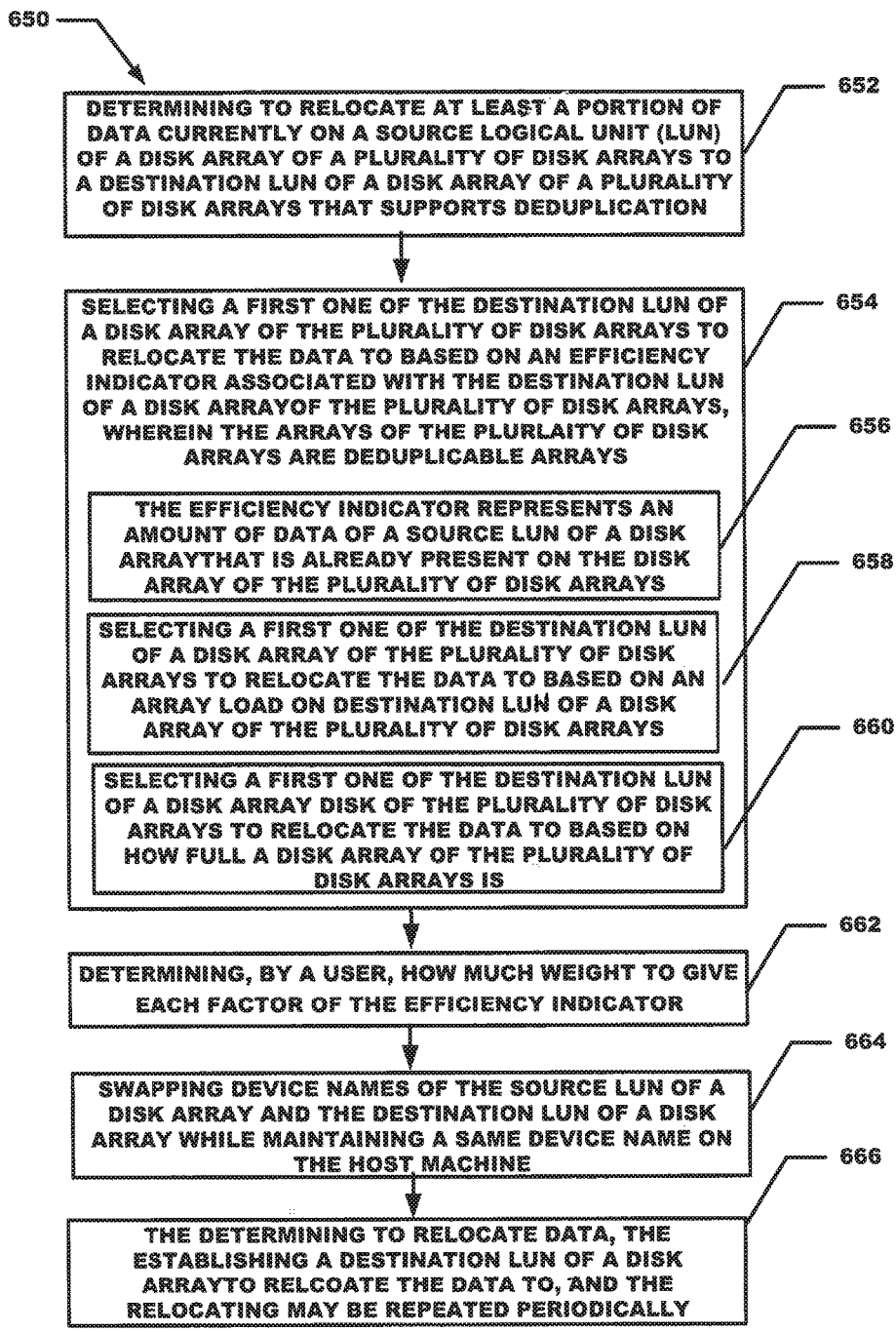
FIG. 6B is a flowchart of a second illustrative disk array target selection method in accordance with illustrative embodiments.

Referring now to FIG. 6B, a flow chart of another embodiment of a method for disk array target selection is shown. Method 650 begins with processing block 652 which shows determining to relocate at least a portion of data currently on a source logical unit (LUN) of a plurality of disk arrays to a destination LUN of a disk array of a plurality of disk arrays that support deduplication.

Processing block 654 shows selecting a first one of the destination LUN of a disk array of the plurality of disk arrays to relocate the data to based on an efficiency indicator associated with the destination LUN of a disk array of the plurality of disk arrays, wherein the plurality of disk arrays are deduplicable arrays.

As shown in processing block 656 the efficiency indicator represents amount of data of a source LUN of a disk array that is already present on a remote disk array of the plurality of remote disk arrays. As further shown in processing block 658 selecting a first one of the destination LUN of a disk array to relocate the data to based on an array load on a disk array of the plurality of disk arrays. As shown in processing block 660, selecting a first one of the destination LUN of a disk array to relocate the data to based on how full a disk array of the plurality of disk arrays is.

Processing block 662 discloses determining, by a user, how much weight to give each factor of the efficiency indicator. For example, in certain conditions the amount of load on a LUN of a disk array may be more important to consider than how full a LUN of a disk array is.

Processing block 664 recites swapping device names of the source LUN of the disk array and the destination LUN of the disk array disk while maintaining a same device name on the host machine.

Processing block 666 shows wherein the determining to relocate data, the establishing a destination LUN of the disk array disk array to relocate the data to, and the relocating may be repeated periodically. The disk array target selection is a dynamic process, and may be re-evaluated periodically to ensure the efficiency of the write process is being performed.

Figure 7:
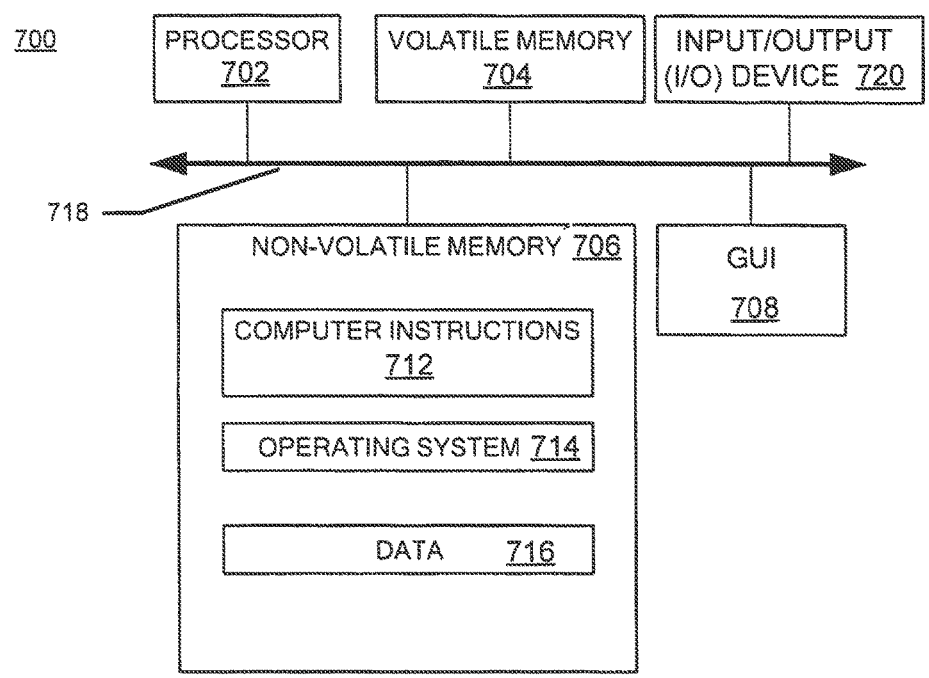
FIG. 7 is a block diagram of an example of a hardware device that may perform at least a portion of the processes in FIG. 6.

In some embodiments, the machines may be implemented as one or more computers such as shown in FIG. 7. As shown in FIG. 7, computer 700 may include processor 702, volatile memory 704 (e.g., RAM), non-volatile memory 706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 708 (e.g., a touchscreen, a display, and so forth) and input/output (I/O) device 720 (e.g., a mouse, a keyboard, etc.), each of which is coupled together by a bus 718. Non-volatile memory 706 stores computer instructions 712, an operating system 714 and data 716 such that, for example, the computer instructions 712 are executed by the processor 702 out of volatile memory 704 to perform at least a portion of the processes described herein. Program code may be applied to data entered using an input device of GUI 708 or received from I/O device 720.

The processes described herein are not limited to use with the hardware and software of FIG. 7 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, the processes are not limited to the specific processing order shown in FIG. 6. Rather, any of the blocks of the processes may be re-ordered, combined or removed, performed in parallel or in serial, as necessary, to achieve the results set forth herein.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a Machine, or transmitted over some transmission medium or carrier, such as over electrical wiring or cabling, through fiber optics, or via electromagnetic radiation. A non-transitory Machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory Machine-readable medium and the program code is loaded into and executed by a Machine, such as a computer, the Machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
    determining, based on an efficiency indicator associated with a destination LUN of a disk array of a plurality of remote disk arrays, to replicate data currently on a source Logical Unit (LUN) disk array of a plurality of disk arrays to the destination LUN of the disk array of the plurality of remote disk arrays, wherein the destination LUN of the disk array supports deduplication;
    receiving a user-specified weight for each factor of the efficiency indicator;
    selecting a first one of the destination LUN of the disk array of the plurality of remote disk arrays to replicate the data based on the efficiency indicator and corresponding weight applied to each factor, wherein the arrays of the plurality of remote disk arrays are deduplicable arrays; and
    replicating the data on the selected source LUN of the disk array of the plurality of disk arrays to the destination LUN of the disk array of the plurality of remote disk arrays.

2. The method of claim 1 wherein the efficiency indicator represents an amount of the data of the source LUN of a disk array device that is already present on a destination LUN of a disk array of the plurality of disk arrays.

3. The method of claim 1 further including selecting a first one of the destination LUN of a disk array of the plurality of disk arrays to replicate the data to based on an array load on the destination LUN of a disk array of the plurality of disk arrays.

4. The method of claim 1 further including selecting a first one of the destination LUN of a disk array of the plurality of disk arrays to replicate the data to based on how full the destination LUN of a disk array of the plurality of disk arrays is.

5. The method of claim 1 wherein the determining to replicate data from the source LUN of a disk array, the establishing a destination LUN of a disk array to write the data to, and the replicating data may be repeated periodically.

6. A storage system comprising:
    a processor; and
    memory storing computer program code that when executed on the processor causes the processor to operate a storage system, the storage system operable to perform the operations of:
    determining, based on an efficiency indicator associated with a destination LUN of a disk array of a plurality of remote disk arrays, to replicate data currently on a source Logical Unit (LUN) disk array of a plurality of disk arrays to the destination LUN of the disk array of the plurality of remote disk arrays wherein the destination LUN of the disk array supports deduplication;

receiving a user-specified weight for each factor of the efficiency indicator;

selecting a first one of the destination LUN of the disk array of the plurality of remote disk arrays to replicate the data based on the efficiency indicator and corresponding weight applied to each factor, wherein the arrays of the plurality of remote disk arrays are deduplicable arrays; and replicating the data on the selected source LUN of the disk array of the plurality of disk arrays to the destination LUN of the disk array of the plurality of remote disk arrays.

7. The storage system of claim 6 wherein the efficiency indicator represents an amount of the data of the source LUN of a disk array that is already present on a destination LUN of a disk array of the plurality of disk arrays.

8. The storage system of claim 6 further including selecting a first one of the destination LUN of a disk array of the plurality of disk arrays to replicate the data to based on an array load on the destination LUN of a disk array of the plurality of disk arrays.

9. The storage system of claim 6 further including selecting a first one of the destination LUN of a disk array of the plurality of disk arrays to replicate the data to based how full the destination LUN of a disk array of the plurality of disk arrays is.

10. The storage system of claim 8 wherein the determining to replicate data from the source LUN of a disk array, the establishing a destination LUN of a disk array to write the data to, and the replicating data may be repeated periodically.

11. A computer program product including a non-transitory computer readable storage medium having computer program code encoded thereon that when executed on a processor of a computer causes the computer to operate a storage system, the computer program product comprising:

computer program code for determining, based on an efficiency indicator associated with a destination LUN of a disk array of a plurality of remote disk arrays, to replicate data currently on a source Logical Unit (LUN) disk array of a plurality of disk arrays to the destination LUN of the disk array of a plurality of remote disk arrays wherein the destination LUN of a disk array supports deduplication;

receiving a user-specified weight for each factor of the efficiency indicator;

computer program code for selecting a first one of the destination LUN of the disk array of the plurality of disk arrays to replicate the data based on the efficiency indicator and corresponding weight applied to each factor, wherein the arrays of the plurality of remote disk arrays are deduplicable arrays; and computer program code for replicating the data on the selected source LUN of the disk array of the plurality of disk arrays to the destination LUN of the disk array of the plurality of remote disk arrays.

12. The computer program product of claim 11 wherein the computer program code for the efficiency indicator represents an amount of the data of the source LUN of a disk array that is already present on a destination LUN of a disk array of the plurality of disk arrays.

13. The computer program product of claim 11 further comprising computer program code for selecting a first one of the destination LUN of a disk array of the plurality of disk arrays to replicate the data to based on an array load on the destination LUN of a disk array of the plurality of disk arrays.

14. The computer program product of claim 13 further comprising computer program code for selecting a first one of the destination LUN of a disk array of the plurality of disk arrays to replicate the data to based on how full the destination LUN of a disk array of the plurality of disk arrays is.

15. The computer program product of claim 13 further comprising computer program code wherein the determining to replicate data from the source LUN of a disk array, the establishing a destination LUN of a disk array to write the data to, and the replicating data may be repeated periodically.

* * * * *